(12) United States Patent
Yao et al.

(10) Patent No.: US 12,436,606 B2
(45) Date of Patent: Oct. 7, 2025

(54) DISPLAY METHOD AND ELECRONIC DEVICE

(71) Applicant: Lenovo (Beijing) Limited, Beijing (CN)

(72) Inventors: Cen Yao, Beijing (CN); Jie Yin, Beijing (CN); Yinzhu Piao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/896,684

(22) Filed: Sep. 25, 2024

(65) Prior Publication Data

US 2025/0130629 A1    Apr. 24, 2025

(30) Foreign Application Priority Data

Oct. 23, 2023    (CN) .......................... 202311377071.9

(51) Int. Cl.
*G06F 3/01*       (2006.01)
(52) U.S. Cl.
CPC .................... *G06F 3/011* (2013.01)

(58) Field of Classification Search
CPC .......... G06F 3/011; G06F 3/017; G06F 19/14; G06T 13/40; G06T 13/20; G09F 19/22
See application file for complete search history.

(56) References Cited

U.S. PATENT DOCUMENTS 9,754,398 B1 * 9/2017 Cardwell .............. G06F 1/1694
2018/0174347 A1 * 6/2018 Chaney .................. G09G 5/377

* cited by examiner

*Primary Examiner* — Sanjiv D. Patel
(74) *Attorney, Agent, or Firm* — ANOVA LAW GROUP, PLLC

(57) ABSTRACT

This application provides a display method, an electronic device. The display method applied to an electronic device, comprising: acquiring activity information of a user; and determining display parameters of an object within at least one three-dimensional space body in a three-dimensional space, based on the activity information, wherein the three-dimensional space includes multiple three-dimensional space bodies; and displaying the object within at least one three-dimensional space body, based on the display parameters of the object within at least one three-dimensional space body.

19 Claims, 10 Drawing Sheets

Second Location

Third Location

First Location

DISPLAY METHOD AND ELECRONIC DEVICE

CROSS-REFERENCE TO RELATED APPLICATION

This application claims priority to Chinese Patent Application No. 202311377071.9, filed on Oct. 23, 2023, and the entire content of which is incorporated herein by reference.

TECHNICAL FIELD

The present disclosure relates to the field of naked-eye 3D display technology, specifically to a display method and an electronic device.

BACKGROUND

Naked-eye 3D (Three Dimensional) display technology allows users to view 3D images directly without wearing glasses. However, the display effect of naked-eye 3D is often relatively limited and lacks diversity in visual expressions. This leads to an unsatisfactory user experience.

SUMMARY

One aspect of the present disclosure provides a display method. The display method includes: acquiring activity information of a user; and determining display parameters of an object within at least one three-dimensional space body in a three-dimensional space, based on the activity information, wherein the three-dimensional space may include multiple three-dimensional space bodies; and displaying the object within at least one three-dimensional space body, based on the display parameters of the object within at least one three-dimensional space body.

Another aspect of the present disclosure provides an electronic device. The device includes a display module, which is configured to display multiple objects in multiple three-dimensional space bodies in a three-dimensional space; and a control module, which is configured to acquire activity information of a user, determine display parameters of the object within at least one three-dimensional space body in the three-dimensional space, based on the activity information, and display the object within at least one three-dimensional space body, based on the display parameters of the object within the three-dimensional space body.

Another aspect of the present disclosure provides a non-transitory computer readable storage medium storing computer instructions that, when executed by one or more processors, cause the one or more processors to implement a display method. The method includes receiving activity information of a user; determining display parameters of an object within a three-dimensional space body in a three-dimensional space, based on the activity information, wherein the three-dimensional space includes one or more three-dimensional space bodies; and displaying the object within the three-dimensional space body, based on the display parameters of the object within the three-dimensional space body.

BRIEF DESCRIPTION OF THE DRAWINGS

To more clearly illustrate the technical solutions in the embodiments of the present disclosure, drawings required for the description of the embodiments are briefly described below. Obviously, the drawings described below are merely some embodiments of the present disclosure. For those skilled in the art, other drawings can be obtained based on these drawings without creative efforts.

DETAILED DESCRIPTION OF THE EMBODIMENTS

To enable those skilled in the art to better understand the technical solutions of the embodiments of the present disclosure, the technical solutions in the embodiments of the present disclosure will be clearly and completely described below in conjunction with the accompanying drawings. Obviously, the described embodiments are merely part of the embodiments of the present disclosure, not all of the embodiments. Based on the embodiments of the present disclosure, all other embodiments obtained by those skilled in the art without creative work are within the scope of the present disclosure.

Figure 1:
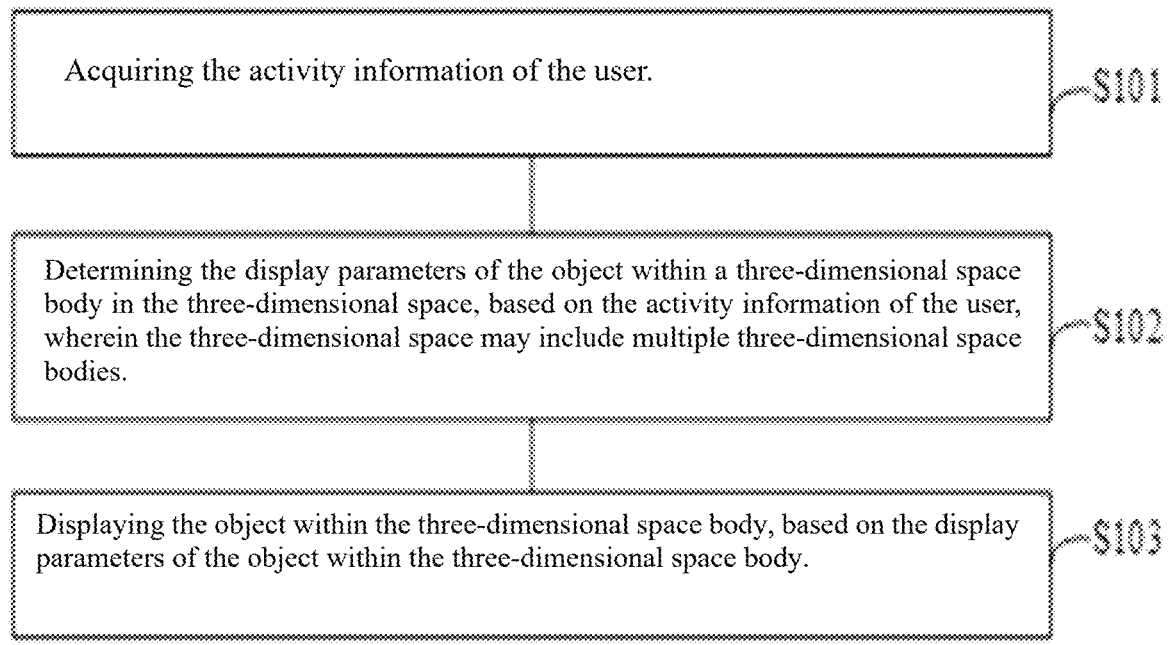
FIG. 1 is a flowchart of a display method provided by the present disclosure.

The present disclosure provides a display method. The display method can be executed by a processor of an electronic device. In this case, the electronic device can be any devices with data processing capabilities, such as a server, a laptop, a tablet, a desktop, a smart TV, a set-top boxes, and a mobile device (e.g., mobile phone, portable video player, personal digital assistant, dedicated messaging devices, portable gaming devices), etc. FIG. 1 is a flowchart of a display method provided by the embodiments of the present disclosure. As shown in FIG. 1, the method includes the steps S101 to S103:

At S101, acquiring activity information of a user.

The activity information corresponds to the activity of the user, which can influence the naked-eye 3D display effect. The type of the activity shall not be limited. For example, the activity could be watching a naked-eye 3D display or adjusting the 3D display effect settings.

In some embodiments of the present disclosure, the activity information of the user may include at least one of the following: current position of the user, operation information on a three-dimensional space body, and operation information of the user on an object within the three-dimensional space body. The current position of the user can refer to the position of the user's eyes or head, or any other relevant information that indicates the user's position. The operation information on the three-dimensional space body of the user, or the operation information of the user on the object within the three-dimensional space body, may refer to direct actions on the display device or operations on an associated smart terminal such as a tablet or smartphone.

In some embodiments of the present disclosure, any suitable method can be used to obtain the activity information of the user, which shall not be limited. For example, user's images can be collected through an image capture device such as a camera, and the current position of the user can be determined by analyzing these images. Infrared distance measurement devices can also be used to determine the current position of the user.

At S102, determining the display parameters of the object within at least one three-dimensional space body in the three-dimensional space, based on the activity information of the user, wherein the three-dimensional space may include multiple three-dimensional space bodies.

In this case, the three-dimensional space body refers to a three-dimensional model within the three-dimensional space; wherein the three-dimensional space body can be a cube, a sphere, a cone, or any other three-dimensional shape, which shall not be limited.

In some embodiments of the present disclosure, multiple objects are configured within each of the multiple three-dimensional space bodies respectively. In the embodiment, different objects can be configured within each of the multiple space bodies, and the multiple three-dimensional space bodies display the objects within them separately, wherein the three-dimensional space bodies are configured in the three-dimensional space. It is understood that, through this process, multiple objects can be simultaneously displayed in the three-dimensional space, thereby enriching the content displayed in the space and diversifying the visual effects, offering the user an innovative and immersive experience.

In some embodiments of the present disclosure, the three-dimensional space body can be a box model, where the face of the box facing to the user is transparent. This allows the user to view the object configured within the box.

In some embodiments of the present disclosure, the object can be either three-dimensional or two-dimensional. When the object is a three-dimensional object, it is a three-dimensional model within the three-dimensional space body. The model can be a character, an animal, a cube, or any other three-dimensional object, which shall not be limited. When the object is a two-dimensional object, it could be text, image, or any other 2D object within the three-dimensional space body, which shall not be limited.

In some embodiments of the present disclosure, when the object is a three-dimensional object, it can be perforated. In this case, at least one sub-object can be set inside the object. The sub-object is also a three-dimensional model within the object. It is understood that by setting the sub-object within the object within the three-dimensional space body, the displayed content can be further enriched.

Figure 2:
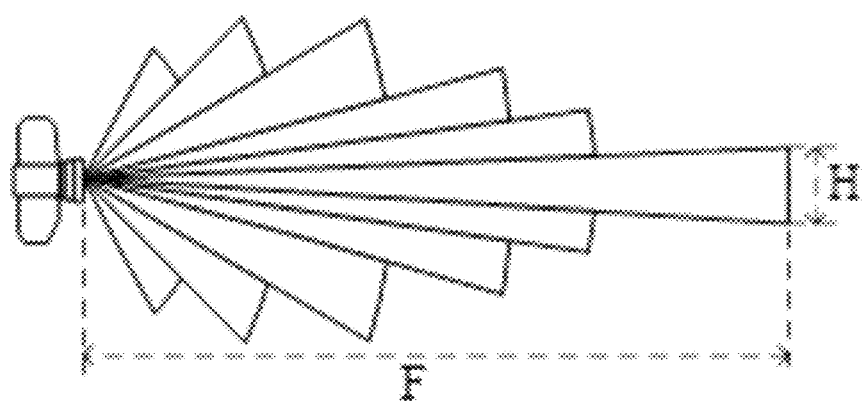
FIG. 2 is a diagram illustrating the relationship between focal length and field of view provided by an embodiment of the present disclosure.
Figure 3:
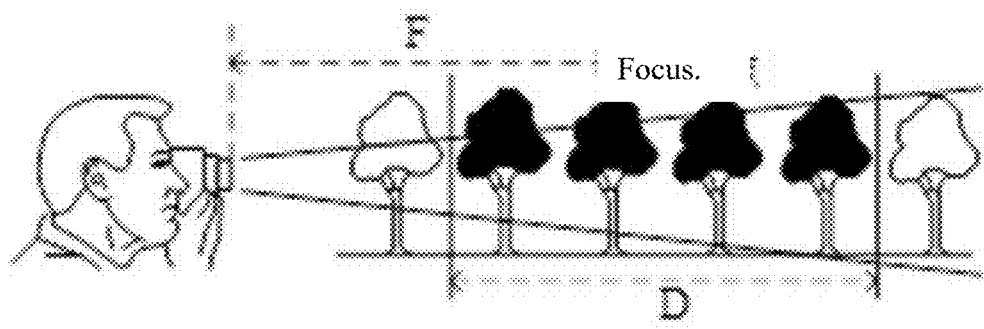
FIG. 3 is a diagram illustrating the relationship between focal length and field depth provided by an embodiment of the present disclosure.
Figure 4:
FIG. 4 is a diagram illustrating the relationship between focal length and photo effect provided by an embodiment of the present disclosure.

In some embodiments of the present disclosure, the camera parameters corresponding to at least one three-dimensional space body, can be determined based on the activity information of the user. Subsequently, the display parameters of the object within at least one three-dimensional space body can be determined based on the camera parameters corresponding to the at least one three-dimensional space body. The camera parameters include focal length, aperture, and other related parameters. In this case, a smaller focal length corresponds to a larger field of view, while a larger focal length results in a smaller field of view, as shown in FIG. 2, where focal length F decreases and field of view H increases. As shown in FIG. 3, the smaller the focal length F, the greater the depth of field D; the larger the focal length F, the smaller the depth of field D. As shown in FIG. 4, as the focal length F increases from 14 mm to 400 mm, the displayed effect of the person 11 in the photo becomes significantly more prominent. In some embodiments of the present disclosure, the display effect of the objects within the three-dimensional space body can be enhanced based on the activity information of the user. For instance, when the user approaches at least one three-dimensional space body, the focal length corresponding to the three-dimensional space body will increase. Therefore, the display effect of the object within that space body will change. It is understood that when the focal length increases, the display effect of the object within the three-dimensional space body becomes more prominent.

In some embodiments of the present disclosure, the display parameters of the object within at least one three-dimensional space body, and the display parameters of at least one three-dimensional space body, can be determined based on the activity information. For example, in the case of displaying a three-dimensional object, after determining the display parameters such as the size of the three-dimensional object, the size of the three-dimensional space body where the object is located can be correspondingly adjusted.

In some embodiments of the present disclosure, the display parameters of one object within the three-dimensional space body can be determined based on the activity information.

In some embodiments of the present disclosure, the display parameters of multiple objects in multiple three-dimensional space bodies can be determined based on the activity information.

In some embodiments of the present disclosure, a target file can first be obtained, in which a mapping function between the activity information and the display parameters of the object is stored. Then, based on the activity information of the user, the target file is looked up to determine the display parameters of the at least one object within three-dimensional space body.

At S103, displaying the object within at least one three-dimensional space body, based on the display parameters of the object within at least one three-dimensional space body.

Here, any suitable display device can be used to display the object, and this shall not be limited to specific devices. For example, the display device can be a glasses-free 3D display screen or a projector. The display parameters of the object are used to determine the display effect of the object within the three-dimensional space body. For instance, when the object is a three-dimensional character model, the display parameters can determine at least one of the size, orientation, or facial lighting of the character model.

In some embodiments of the present disclosure, the display of one object within the three-dimensional space body can be based on the display parameters of that object within the single three-dimensional space body.

In some embodiments of the present disclosure, the display of multiple objects in multiple three-dimensional space bodies can be displayed based on the respective multiple display parameters of the objects within multiple three-dimensional space bodies.

In this embodiment, by acquiring the activity information of the user, determining the display parameters of the at least one object within three-dimensional space body, based on the activity information, wherein the three-dimensional space may include multiple three-dimensional space bodies; and displaying the object within at least one three-dimensional space body, based on the display parameters of the object within at least one three-dimensional space body. In this case, on one hand, since the three-dimensional space may include multiple three-dimensional space bodies, and multiple objects are configured within multiple three-dimensional space bodies. This allows for the independent presentation of each object within each space body, which helps to enhance the display effect of the object. On the other hand, by determining the displaying of the object, based on the activity information of the user, the realism of the glasses-free 3D display can be improved, thereby enhancing the user's interactive experience.

In some embodiments of the present disclosure, the activity information includes at least one of the following information: the current position of the user, the operation information on the three-dimensional space body of the user, and the operation information on the displayed object within the three-dimensional space body of the user. The operation information on the three-dimensional space body includes at least one of the following: a selection operation on the three-dimensional space body, a movement operation on the three-dimensional space body, a scaling operation on the three-dimensional space body, and an editing operations on the three-dimensional space body.

In some embodiments of the present disclosure, any suitable method can be used to perform the operations on the three-dimensional space body, and on the object within the three-dimensional space body of the user, and it shall not be limited here. For example, operations can be performed through air gestures or by tapping the display device.

In some embodiments of the present disclosure, the operation information of the user on the object within the three-dimensional space body includes at least one of the following: the selection operation on the object within the three-dimensional space body, the movement operation on the object within the three-dimensional space body, the scaling operation on the object within the three-dimensional space body, and the editing operation on the object within the three-dimensional space body.

In this embodiment, since there are multiple types of activity information of the user, the displaying of the object within the three-dimensional space body, based on various activity information of the user, can effectively enhance the realism of the glasses-free 3D display, thereby improving the user's interactive experience.

In some embodiments of the present disclosure, the activity information includes the current location of the user, and the display parameters include posture parameters and/or light and shadow parameters. At S102, the step of determining the display parameters of the object within at least one three-dimensional space body in the three-dimensional space based on the activity information, may further include S111:

At S111, generating the posture parameters and/or light and shadow parameters of the object within at least one three-dimensional space body according to the current location of the user.

Figure 5:
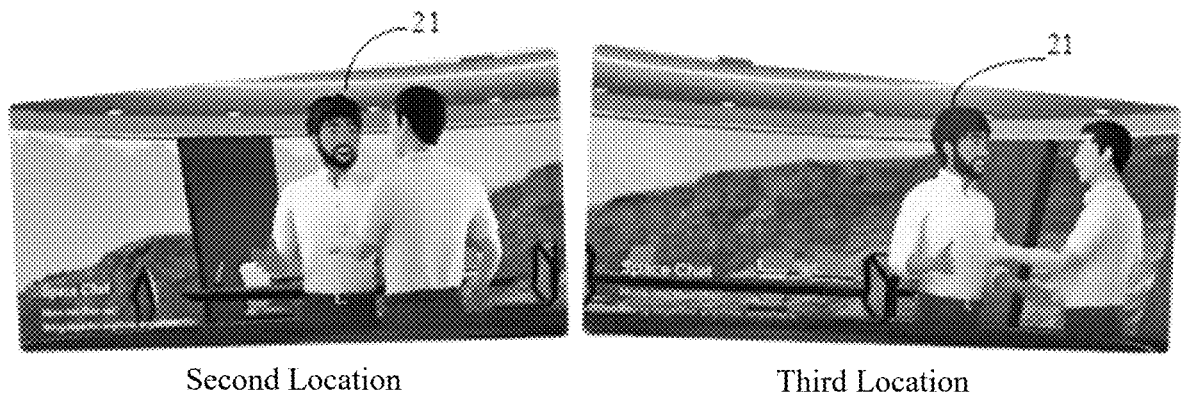
FIG. 5 is a diagram of the display effects of an object, viewed from different locations of the user, provided by an embodiment of the present disclosure.

In this case, it is understood that when the user is viewing a glasses-free 3D display, the display effect of the object within the three-dimensional space body will vary depending on the position of the user. As shown in FIG. 5, when the current location of the user is at a second position, the object 21 in the three-dimensional space body corresponds to a set of posture parameters and/or light and shadow parameters. As the user changes position and the current location moves to a third position, the object 21 in the three-dimensional space body corresponds to another set of posture parameters and/or light and shadow parameters. The display effect of the object 21 will differ depending on the position of the user.

In some embodiments of the present disclosure, based on the current location of the user, the posture parameters and/or light and shadow parameters of one object within a three-dimensional space body can be generated.

In some embodiments of the present disclosure, based on the current location of the user, the posture parameters and/or light and shadow parameters of multiple objects in multiple three-dimensional space bodies can be generated as well.

In this embodiment, generating the posture parameters and/or light and shadow parameters of the object within at least one three-dimensional space body based on the current location of the user can enhance the user's spatial perception during glasses-free 3D viewing, thereby improving the user's interactive experience.

In some embodiments of the present disclosure, step S111, wherein the posture parameters and/or light and shadow parameters of the object within at least one three-dimensional space body are generated according to the current location of the user, may include steps from S121 to S122:

At S121, determining the viewing distance and/or viewing angle of the user, based on the current location of the user.

In some embodiments of the present disclosure, the viewing distance and/or viewing angle of the user can be determined based on the current location of the user, and the position of the display device.

In some embodiments of the present disclosure, the viewing angle and viewing distance of the user can be determined based on the current location of the user.

At S122, generating the posture parameters and/or light and shadow parameters of the object within at least one three-dimensional space body according to the viewing distance and/or viewing angle of the user.

In some embodiments of the present disclosure, the viewing distance can be represented by a viewing distance vector, and based on the viewing distance vector of the user, the posture parameters and/or light and shadow parameters of at the least one object within the three-dimensional space body can be generated.

In some embodiments of the present disclosure, the posture parameters and/or light and shadow parameters of the object within at least one three-dimensional space body can be generated according to the viewing angle of the user.

In this embodiment of the present disclosure, generating the posture parameters and/or light and shadow parameters of the object within at least one three-dimensional space body based on the viewing distance and/or viewing angle of the user, can make the displayed object more in line with the user's visual habits, thereby improving the user's interactive experience.

In some embodiments of the present disclosure, step S111, wherein the posture parameters and/or light and shadow parameters of the object within at least one three-dimensional space body are generated according to the current location of the user, may include steps from S131 to S132:

At S131, determining the positional offset between the current location of the user and a first position; wherein the first position corresponds to specific posture parameters and/or specific light and shadow parameters of the object within at least one three-dimensional space body.

In this case, the specific posture parameters and specific light and shadow parameters can be determined by professionals continually adjusting the display parameters of the object at the first position, or they can be retrieved from the cloud based on the model of the display device, which shall not be limited.

Figure 6:
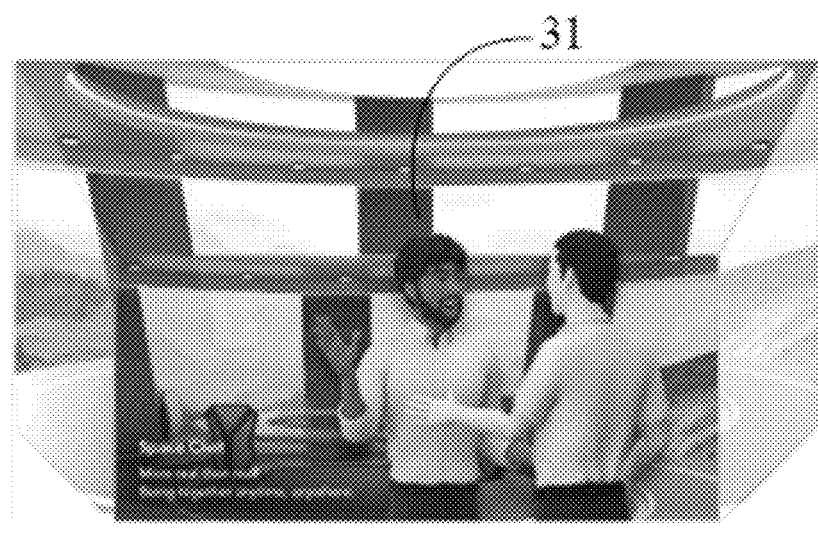
FIG. 6 is a diagram of the display effects of an object, viewed from a first position of the user, provided by an embodiment of the present disclosure.

In some embodiments of the present disclosure, as shown in FIG. 6, the first position corresponds to a set of specific posture parameters and/or specific light and shadow parameters of the object 31 within at least one three-dimensional space body. These specific posture parameters and/or specific light and shadow parameters are used to provide the user with an optimal glasses-free 3D viewing experience when the user is at the first position.

At S132, determining the posture parameters and/or light and shadow parameters of the object within at least one three-dimensional space body based on the positional offset and the specific posture parameters and/or specific light and shadow parameters of the object within the three-dimensional space body.

In some embodiments of the present disclosure, the specific posture parameters include specific size parameters; and the positional offset includes one of the following: forward positional offset or backward positional offset. In some embodiments of the present disclosure, when the user moves forward relative to the first position while facing the display device, the specific size parameters of the object can be increased based on the forward positional offset, thereby determining the size parameters of the object.

In some embodiments of the present disclosure, the specific posture parameters include specific position parameters; and the positional offset includes one of the following: left positional offset, right positional offset, upward positional offset, or downward positional offset. In some embodiments of the present disclosure, when the user moves left relative to the first position, while facing the display device, the specific position parameters of the object can be changed based on the left positional offset, thereby determining the position parameters of the object.

In this embodiment of the present disclosure, determining the posture parameters and/or light and shadow parameters of the object within at least one three-dimensional space body, based on the positional offset and the specific posture parameters and/or specific light and shadow parameters of the object within the three-dimensional space body, helps present a better display effect to the user during glasses-free 3D viewing.

In some embodiments of the present disclosure, the method may further include steps from S141 to S142:

At S141, determining a stay duration at the current location of the user.

In some embodiments of the present disclosure, the spatiotemporal trajectory information of the user can be acquired, and based on this information, the stay duration at the current location of the user can be determined.

At S142, if the stay duration exceeds a time threshold, updating the first position based on the current location of the user to obtain the updated first position.

In some embodiments of the present disclosure, after obtaining the updated first position, the displayed object can be updated based on the updated first position, allowing the user to achieve the optimal glasses-free 3D viewing experience at the current location.

In this embodiment of the present disclosure, updating the first position based on the stay duration of the user can enhance the interactive experience during glasses-free 3D viewing, helping to improve the glasses-free 3D viewing effect for the user.

In some embodiments of the present disclosure, the operation information on the three-dimensional space body includes the selection operation on the three-dimensional space body. At S102, the step wherein the display parameters of the object within at least one three-dimensional space body are determined based on the activity information, may further include steps from S151 to S152:

At S151, determining the target three-dimensional space body from multiple three-dimensional space bodies based on the selection operation of the user on the three-dimensional space body.

In some embodiments of the present disclosure, the user can perform the selection operation using any suitable method, which shall not be limited. For example, the user can select the three-dimensional space body through air gestures or by tapping the display device.

At S152, determining the display parameters of the object within the target three-dimensional space body.

In some embodiments of the present disclosure, the display parameters include the posture parameters and/or light and shadow parameters.

In some embodiments of the present disclosure, the display parameters of both the object within the target three-dimensional space body, and the target three-dimensional space body itself, can be determined.

In this embodiment of the present disclosure, since the user can determine the display parameters of the object within the target three-dimensional space body through the selection operation, the interactive experience during glasses-free 3D viewing can be effectively enhanced.

In some embodiments of the present disclosure, the activity information includes the operation information on the object within the three-dimensional space body. At S102, the step wherein the display parameters of the object within at least one three-dimensional space body are determined based on the activity information, may further include step S161:

At S161, updating the display parameters of the object within at least one three-dimensional space body based on the operation information of the object within the three-dimensional space body, and determining the updated display parameters of the object within at least one three-dimensional space body.

In some embodiments of the present disclosure, by selecting the object, the user can perform various operations on the object, such as deleting or copying.

At S103, the step wherein object within at least one three-dimensional space body is displayed based on the display parameters of the object within at least one three-dimensional space body may further include step S171:

At S171, displaying object within at least one three-dimensional space body based on the updated display parameters of the object within at least one three-dimensional space body.

In some embodiments of the present disclosure, one object within one three-dimensional space body can be displayed based on the updated display parameters of the object within that three-dimensional space body.

In some embodiments of the present disclosure, multiple objects in multiple three-dimensional space bodies can be displayed based on the updated display parameters of the object within one three-dimensional space body.

In this embodiment of the present disclosure, since the user can perform operations on the object, the user can directly change the display parameters of the object. The display parameters of the object can better match the actual needs of the user, enhancing the user's glasses-free 3D viewing experience.

In some embodiments of the present disclosure, the aforementioned user may be a group and include at least two target users. At S102, the step wherein the display parameters of the object within at least one three-dimensional space body in the three-dimensional space are determined based on the activity information, may further include step S181:

At S181, determining the display parameters of the object within at least one three-dimensional space body in the three-dimensional space, corresponding to each target user, based on the activity information of the target user.

In some embodiments of the present disclosure, the display device for displaying the object includes at least two display layers. Based on the display parameters of the object within at least one three-dimensional space body corresponding to each target user, the object is displayed separately in each display layer, providing a glasses-free 3D display to each target user.

In this embodiment of the present disclosure, by determining the display parameters of the object within at least one three-dimensional space body in the three-dimensional space corresponding to each target user, a glasses-free 3D display can be provided simultaneously to multiple target users in the same scene, effectively enhancing the user's glasses-free 3D viewing experience.

The following describes the application of the display method provided by the embodiments of the present disclosure, in actual scenarios, using the glasses-free 3D display as an example.

In related technologies, on one hand, the design of glasses-free 3D displays still follows traditional display methods. For example, the entire screen has a 3D effect, which fails to highlight the unique characteristics of 3D display. On the other hand, the display effects of glasses-free 3D are relatively simple, and many artistic techniques cannot be fully expressed, leading to limited visual diversity and a poor user experience.

Figure 7:
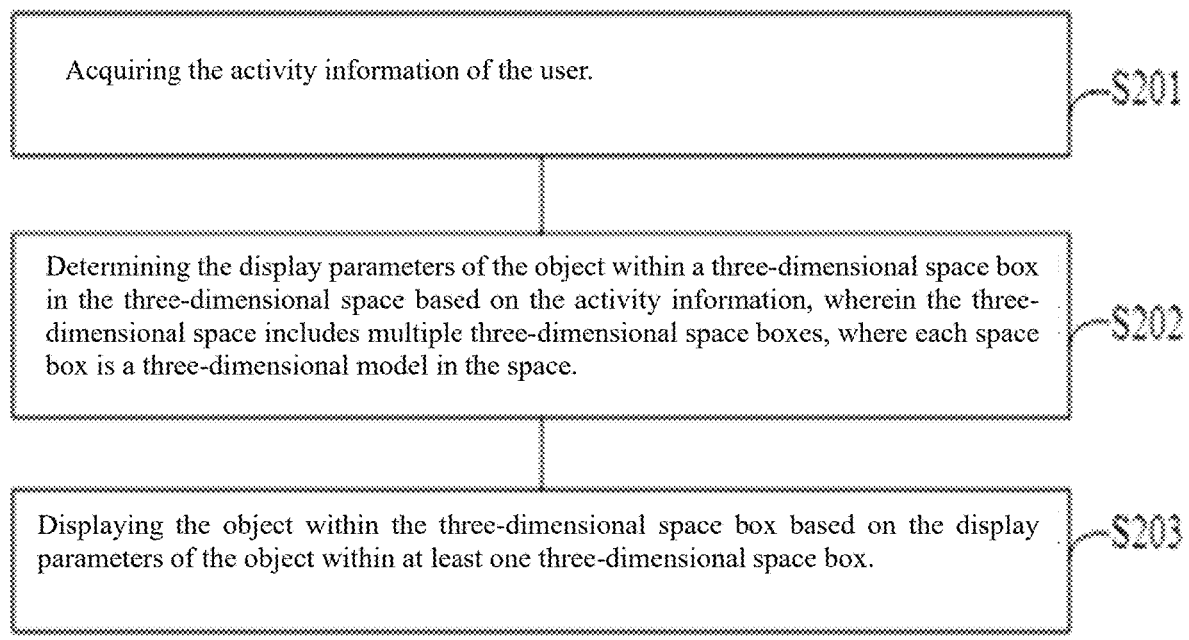
FIG. 7 is a flowchart of a display method provided by another embodiment of the present disclosure.

To address this problem, the present disclosure provides a display method that can be applied to an electronic device. As shown in FIG. 7, the method includes the following steps from S201 to S203:

At S201, acquiring the activity information of the user.

At S202, determining the display parameters of the object within at least one three-dimensional space box in the three-dimensional space based on the activity information, wherein the three-dimensional space includes multiple three-dimensional space boxes, where each space box is a three-dimensional model in the space.

In some embodiments of the present disclosure, the side of the three-dimensional space box facing the user may be transparent, allowing the user to see the object within the three-dimensional space box.

At S203, displaying the object within at least one the three-dimensional space box based on the display parameters of the object within at least one three-dimensional space box.

In some embodiments, multiple three-dimensional space boxes can be nested within one three-dimensional space box.

In this embodiment of the present disclosure, the display method includes: acquiring the activity information of the user; and determining the display parameters of the object within at least one three-dimensional space box, where the three-dimensional space may include multiple three-dimensional space boxes; and displaying the object based on the parameters of the object within at least one three-dimensional space box. On one hand, since the three-dimensional space includes the three-dimensional space boxes, and the objects are configured within the three-dimensional space boxes, it allows for the independent presentation of the objects within the three-dimensional space boxes, which helps enhance the display effect of the objects within the three-dimensional space boxes. On the other hand, since the three-dimensional space includes multiple three-dimensional space boxes, each of the multiple three-dimensional space box can display the object within respectively and independently in the three-dimensional space. As a result, multiple objects can be displayed simultaneously in the three-dimensional space. This enriches the visual content and provides a more diverse and novel experience. Moreover, determining the display based on the activity information of the user, improves the realism of the glasses-free 3D display, enhancing the interactive experience.

The display method enhances the user experience.

Figure 8:
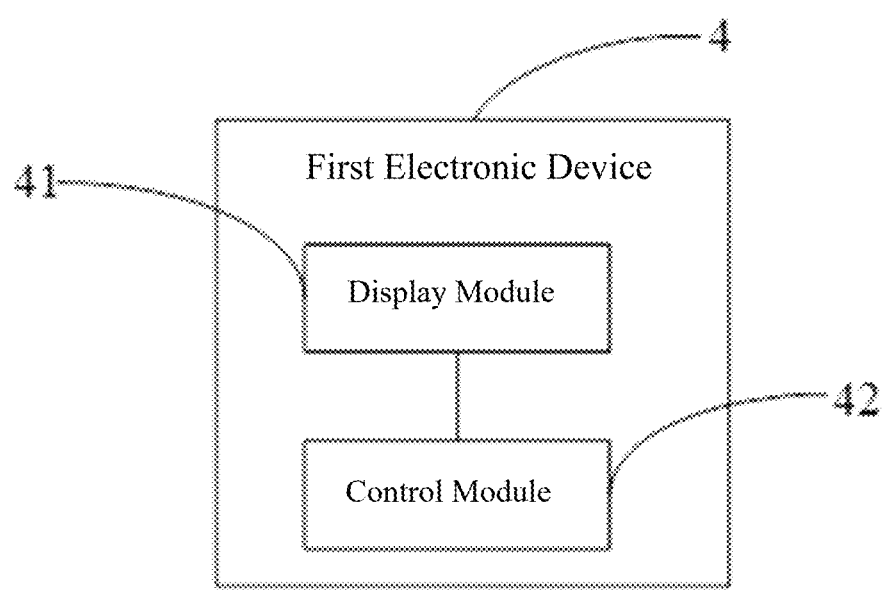
FIG. 8 is a diagram of the structure of the electronic device provided by the present disclosure.

The present disclosure provides a first electronic device. As shown in FIG. 8, the first electronic device 4 includes:

A display module 41, which is configured to display the objects within multiple three-dimensional space bodies in three-dimensional space;

A control module 42, which is configured to acquire the activity information of the user; and determining the display parameters of the object within at least one three-dimensional space body, based on the activity information; and displaying the object within at least one three-dimensional space body, based on the display parameters of the objects.

In some embodiments of the present disclosure, the activity information includes at least one of the following: the current location of the user, the operation information of the user on the three-dimensional space body, the operation information of the user on the object within the three-dimensional space body. The operation information on the three-dimensional space body includes at least one of the following: a selection operation on the three-dimensional space body, a movement operation on the three-dimensional space body, a scaling operation on the three-dimensional space body, and an editing operation on the three-dimensional space body.

In some embodiments of the present disclosure, the activity information includes the current location of the user, and the display parameters include posture parameters and/or lighting parameters. The control module 42 is further used to generate the posture parameters and/or lighting parameters for the object within at least one three-dimensional space body based on the current location of the user.

In some embodiments of the present disclosure, the control module 42 is further used to determine viewing distance and/or viewing angle of the user, based on the current location of the user; and generate the posture parameters and/or lighting parameters of the object within at least one three-dimensional space body, according to the viewing distance and/or viewing angle.

In some embodiments of the present disclosure, the control module 42 is further used to determine the position offset between the current location of the user and a first location. The first location corresponds to the specific posture parameters and/or lighting parameters of the object within at least one three-dimensional space body. Based on the position offset and the specific posture parameters and/or lighting parameters of the object within the three-dimensional space body, the posture parameters and/or lighting parameters of the object within at least one three-dimensional space body can be determined.

In some embodiments of the present disclosure, the control module 42 is further used to determine a stay duration of the user at the current location. If the stay duration exceeds a time threshold, then the first location is updated based on the current location of the user, to obtain an updated first location.

In some embodiments of the present disclosure, the operation information on the three-dimensional space body includes the selection operation. The control module 42 is further used to determine a target three-dimensional space body from the multiple three-dimensional space bodies based on the selection operation, and determine the display parameters of the object within the target three-dimensional space body.

In some embodiments of the present disclosure, the activity information includes the operation information on the object within the three-dimensional space body. The control module 42 is further configured to update the display parameters of the object within at least one three-dimensional space body, based on the operation information on the object within the three-dimensional space body, and determine the updated display parameters of the object within at least one three-dimensional space body. The control module 42 is further configured to display the object within at least one three-dimensional space body, based on the updated display parameters of the object within at least one three-dimensional space body.

In some embodiments, the aforementioned user may be a group and include at least two target users, and the control module 42 is further configured to determine the display parameters of the object within at least one three-dimensional space body, corresponding to each target user, based on their respective activity information.

The description of the device embodiments above is similar to the description of the method embodiments and has similar advantageous effects. In some embodiments, the functions or modules included in the device embodiments of this application can be used to execute the methods described in the method embodiments. For technical details not disclosed in the device embodiments, please refer to the description of the method embodiments for further understanding.

If the technical solutions of this application involve personal information, products applying the technical solutions will clearly inform individuals of the rules for processing personal information and obtain their independent consent before processing such information. If the technical solutions involve sensitive personal information, the products will obtain separate consent from individuals prior to processing and comply with the requirement of "explicit consent." For example, for personal information collection devices such as cameras, clear and prominent signs will indicate that the user is entering a personal information collection area, and personal information will be collected. If an individual voluntarily enters the collection area, this is considered as consent to collect their personal information. Alternatively, on devices that process personal information, users may be informed of the personal information processing rules via clear signage or messages, and authorization can be obtained through methods such as pop-up notifications or by prompting the user to upload their personal information. The personal information processing rules may include details such as the entity processing the information, the purpose of processing, the methods of processing, and the types of personal information being processed.

It is important to note that in the embodiments of the present disclosure, if the aforementioned behavior display method is implemented in the form of software function modules and sold or used as an independent product, it can also be stored on a computer-readable storage medium. Based on this understanding, the technical solutions of the embodiments of this application, or the parts that contribute to the relevant technology, can be embodied as software products. These software products are stored on a storage medium and include multiple instructions to enable an electronic device (such as a personal computer, server, or network device) to execute all or part of the methods described in the various embodiments of this application. The aforementioned storage mediums may include: USB drives, portable hard drives, read-only memory (ROM), magnetic disks, optical disks, and other media capable of storing program code. As such, the embodiments of this application are not limited to any specific hardware, software, or firmware, or any combination of these.

The present application provides an electronic device. The electronic device includes a memory and a processor. The memory stores a computer program that is configured to run on the processor. When the processor executes the program, it implements part or all of the steps in the above method.

This present application provides a display device. The display device includes an acquisition module, a determination module, and a display module, wherein: the acquisition module is configured to obtain the activity information of the user; and the determination module is configured to determine the display parameters of the at least on object within the three-dimensional space body, based on the activity information of the user, wherein the aforementioned three-dimensional space can include multiple three-dimensional space bodies; the display module is configured to display object within at least one three-dimensional space body, based on the display parameters of the object within at least one three-dimensional space body.

Figure 9:
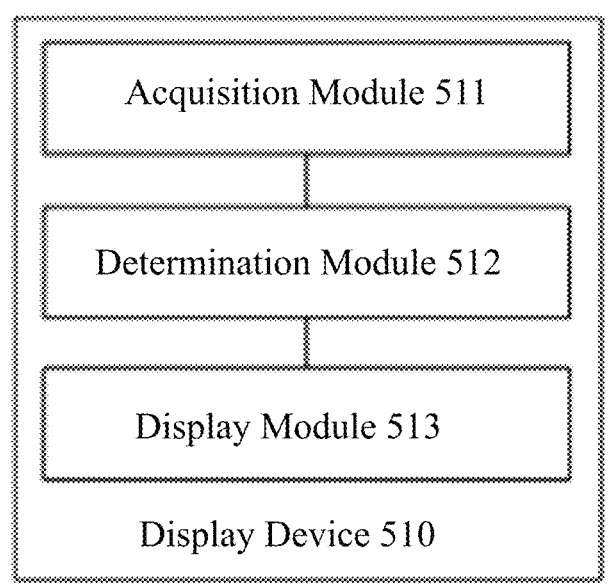
FIG. 9 is a diagram of the structure of the display device provided the present disclosure.

FIG. 9 is a diagram of the structure of the display device provided the present disclosure. As shown in FIG. 9, the display device 510 includes:

An acquisition module 511, which is configured to obtain the activity information of the user;

A determination module 512, which is configured to determine the display parameters of the object within at least one three-dimensional space body, based on the activity information, wherein the three-dimensional space may include multiple three-dimensional space bodies;

A display module 513, which is configured to display the object within at least one three-dimensional space body, based on the display parameters of the object within at least one three-dimensional space body.

The present application provides a computer-readable storage medium. A computer program is stored on the storage medium. When the computer program is executed by the processor, it implements part or all of the steps in the above method. The computer-readable storage medium may be either volatile or non-volatile.

The present application provides a computer program that includes computer-readable code. When the computer-readable code is run on an electronic device, the processor in the electronic device executes part or all of the steps in the above method.

The present application provides a computer program product. The computer program product includes a non-volatile computer-readable storage medium that stores the computer program. When the computer program is read and executed by a computer, it implements part or all of the steps in the above method. The computer program product can be implemented in hardware, software, or a combination of both. In some embodiments, the computer program product is embodied as a computer storage medium, and in other embodiments, it is embodied as a software product, such as a Software Development Kit (SDK) or similar.

It should be noted that the description above emphasizes the differences between various embodiments, and the similarities may be cross-referenced. The descriptions of the embodiments of the devices, storage media, computer programs, and computer program products are similar to the descriptions of the method embodiments and offer similar beneficial effects. For the undisclosed technical details of the embodiments of the devices, storage media, computer programs, and computer program products, please refer to the descriptions of the method embodiments.

Figure 10:
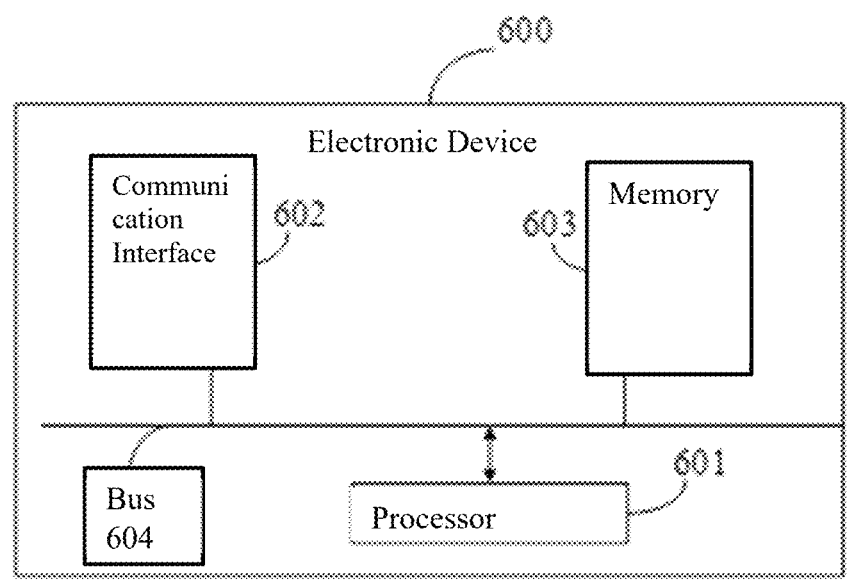
FIG. 10 is a diagram of the hardware entity of the electronic device provided by the present disclosure.

It should also be noted that FIG. 10 is a schematic diagram of a hardware entity of the electronic device in this embodiment of the present application. As shown in FIG. 10, the hardware entity of the electronic device 600 includes: a processor 601, a communication interface 602, and a memory 603, wherein: the processor 601 typically controls the overall operation of the electronic device 600. The communication interface 602 allows the electronic device to communicate with other terminals or servers through a network. The memory 603 is configured to store instructions and applications executable by the processor 601, and it can also cache data to be processed or already processed by the processor 601 or other modules in the electronic device 600 (such as image data, audio data, voice communication data, and video communication data). It can be implemented using flash memory (FLASH) or random access memory (RAM). Data transfer between the processor 601, the communication interface 602, and the memory 603 can be carried out through a bus 604.

It should be understood that the phrases "one embodiment" or "some embodiments" mentioned throughout the specification mean that a particular feature, structure, or characteristic related to the embodiment is included in at least one embodiment of the present disclosure. Therefore, the appearance of "in one embodiment" or "in some embodiments" in various parts of the specification does not necessarily refer to the same embodiment. Moreover, these specific features, structures, or characteristics can be combined in any suitable manner in one or more embodiments. It should be understood that in the various embodiments of the present disclosure, the numbering of the steps/processes does not imply the execution order. The execution order of the steps/processes should be determined based on their functionality and intrinsic logic, and should not imposture any limitations on the implementation of the embodiments of the present application. The numbering of the embodiments mentioned above is solely for the purpose of description and does not represent the superiority or inferiority of the embodiments.

It should be noted that the terms "include," "comprise," or any variations thereof, as used herein, are intended to encompass a non-exclusive inclusion, so that a process, method, article, or apparatus that includes a series of elements not only includes those elements but may also include other elements not explicitly listed, or elements inherent to such process, method, article, or apparatus. Without further limitation, an element defined by the phrase "comprising a . . . " does not exclude the presence of additional identical elements in the process, method, article, or apparatus that includes the element. In the various embodiments provided in this application, it should be understood that the disclosed apparatus and methods can be implemented in other ways. The described apparatus embodiments are merely illustrative. For example, the division of units is merely a logical functional division; in actual implementation, there may be other ways to divide them. For instance, multiple units or components can be combined, integrated into another system, or certain features may be omitted or not executed. Additionally, the coupling, direct coupling, or communication connections between the various components shown or discussed may be achieved via interfaces, indirect coupling, or communication connections between devices or units, which may be electrical, mechanical, or in other forms.

The units described as separate components may or may not be physically separated. Components shown as units may or may not be physical units. They may be located in one place or distributed across multiple network units. Depending on actual needs, some or all units may be selected to achieve the objectives of this embodiment. Furthermore, the functional units in each embodiment of this application may be entirely integrated into one processing unit, or each unit may be separately implemented as an individual unit, or two or more units may be integrated into one unit. The integrated units can be implemented in hardware form or as hardware and software functional units.

A person skilled in the art can understand that all or part of the steps of the above method embodiments can be accomplished by program instructions executed by relevant hardware. The aforementioned program can be stored on a computer-readable storage medium, and when executed, it performs the steps of the above method embodiments. The aforementioned storage medium includes mobile storage devices, Read-Only Memory (ROM), magnetic disks, optical disks, and other media capable of storing program code.

Alternatively, if the integrated units described in this application are implemented as software function modules and sold or used as standalone products, they can also be stored on a computer-readable storage medium. Based on this understanding, the technical solutions of this application, in essence, or the part that contributes to the related technology, can be embodied as a software product. This computer software product is stored on a storage medium and includes several instructions to enable an electronic device (which may be a personal computer, server, or network device) to execute all or part of the methods described in the embodiments of this application. The aforementioned storage medium includes mobile storage devices, ROM, magnetic disks, optical disks, and other media capable of storing program code.

The above description is merely an embodiment of this application. However, the scope of protection of this application is not limited to this. Any person skilled in the art can easily conceive of variations or replacements within the technical scope disclosed in this application, and such variations or replacements should be included within the scope of protection of this application.

What is claimed is:

1. A display method, applied to an electronic device, comprising:
   acquiring activity information of a user, the activity information including a current location of the user;
   determining display parameters of an object within a three-dimensional space body in a three-dimensional space, based on the activity information, wherein the three-dimensional space includes one or more three-dimensional space bodies, and determining the display parameters includes:
  determining a positional offset between the current location of the user and a first position, the first position corresponding to specific display parameters of the object within the three-dimensional space body, and the specific display parameters providing the user with optimal viewing experience when the user is at the first position; and
  displaying the object within the three-dimensional space body, based on the display parameters of the object within the three-dimensional space body.

2. The method according to claim 1, wherein:
the activity information further includes at least one of the following: operation information of the user on the three-dimensional space body, and operation information of the user on the object within the three-dimensional space body; and
the operation information on the three-dimensional space body includes at least one of the following: a selection operation on the three-dimensional space body, a movement operation on the three-dimensional space body, a scaling operation on the three-dimensional space body, and an editing operation on the three-dimensional space body.

3. The method according to claim 1, wherein:
the display parameters include posture parameters and/or light and shadow parameters; and
the determining display parameters of the object within the three-dimensional space body in the three-dimensional space, based on the activity information, further includes:
  generating the posture parameters and/or the light and shadow parameters of the object within the three-dimensional space body, based on the current location of the user.

4. The method according to claim 3, wherein generating the posture parameters and/or the light and shadow parameters of the object within the three-dimensional space body based on the current location of the user, includes:
  determining a viewing distance and/or a viewing angle of the user, based on the current location of the user; and
  generating the posture parameters and/or the light and shadow parameters of the object within the three-dimensional space body, based on the viewing distance and/or viewing angle of the user.

5. The method according to claim 3, wherein generating the posture parameters and/or the light and shadow parameters of the object within the three-dimensional space body, based on the viewing distance and/or viewing angle of the user, includes:
  determining the posture parameters and/or the light and shadow parameters of the object within the three-dimensional space body, based on the positional offset and the specific posture parameters and/or specific light and shadow parameters of the object within the three-dimensional space body.

6. The method according to claim 5, further comprising:
determining a stay duration at the current location of the user; and
if the stay duration exceeds a time threshold, obtaining an updated first position by updating the first position based on the current location of the user.

7. The method according to claim 2, wherein the operation information on the three-dimensional space body includes the selection operation on the three-dimensional space body;
the determining the display parameters of the object of three-dimensional space body in the three-dimensional space, based on the activity information, further includes:
  determining a target three-dimensional space body from multiple three-dimensional space bodies based on the selection operation on the three-dimensional space body of the user; and
  determining the display parameters of the object within the target three-dimensional space body.

8. The method according to claim 2, wherein the activity information further includes the operation information on the object within the three-dimensional space body;
the determining the display parameters of the object within the three-dimensional space body in the three-dimensional space, based on the activity information, further includes:
  determining the updated display parameters of the object within the three-dimensional space body, by updating the display parameters of the object within the three-dimensional space body, based on the operation information on the object within the three-dimensional space body;
  displaying the object within the three-dimensional space body, based on the display parameters of the object within the three-dimensional space body; and
  displaying the object within the three-dimensional space body, based on the updated display parameters of the object within the three-dimensional space body.

9. The method according to claim 1, wherein the user is a group that includes at least two target users; and
the determining the display parameters of the object within the three-dimensional space body in the three-dimensional space, based on the activity information, includes:
determining the display parameters of the object within the three-dimensional space body in the three-dimensional space for each target user, based on the activity information of the target user.

10. An electronic device, comprising:
a display module, configured to display multiple objects in multiple three-dimensional space bodies in a three-dimensional space; and
a control module, configured to:
  acquire activity information of a user, the activity information including a current location of the user;
  determine display parameters of an object within a three-dimensional space body in the three-dimensional space, based on the activity information, wherein determining the display parameters includes determining a positional offset between the current location of the user and a first position, the first position corresponding to specific display parameters of the object within the three-dimensional space body, the specific display parameters providing the user with optimal viewing experience when the user is at the first position; and
  display the object within the three-dimensional space body based on the display parameters of the object within the dimensional space body.

11. The electronic device according to claim 10, wherein the activity information further includes at least one of the following: operation information of the user on one of the multiple three-dimensional space bodies, and operation information of the user on the object within the three-dimensional space body; and the operation information on the three-dimensional space body includes at least one of the following: a selection operation on the three-dimensional space body, a movement operation on the three-dimensional space body, a scaling operation on the three-dimensional space body, and an editing operation on the three-dimensional space body.

12. The electronic device according to claim 10, wherein the display parameters include posture parameters and/or light and shadow parameters; and the control module is further configured to:
generate the posture parameters and/or the light and shadow parameters of the object within the three-dimensional space body, based on the current location of the user.

13. The electronic device according to claim 12, wherein the control module is further configured to:
determine a viewing distance and/or a viewing angle of the user, based on the current location of the user; and
generate the posture parameters and/or the light and shadow parameters of the object within the three-dimensional space body, based on the viewing distance and/or viewing angle of the user.

14. The electronic device according to claim 12, wherein the control module is further configured to:
determine the posture parameters and/or the light and shadow parameters of the object within the three-dimensional space body, based on the positional offset and the specific posture parameters and/or specific light and shadow parameters of the object within the three-dimensional space body.

15. The electronic device according to claim 14, wherein the control module is further configured to:
determine a stay duration at the current location of the user; and
if the stay duration exceeds a time threshold, obtain an updated first position, by updating the first position based on the current location of the user.

16. The electronic device according to claim 11, wherein the operation information on the three-dimensional space body includes the selection operation on the three-dimensional space body, and the control module is further configured to:
determine a target three-dimensional space body from multiple three-dimensional space bodies, based on the selection operation on the three-dimensional space body of the user; and determine the display parameters of the object within the target three-dimensional space body.

17. The electronic device according to claim 11, wherein the activity information further includes the operation information on the object within the three-dimensional space body, and the control module is further configured to:
determine the updated display parameters of the object within the three-dimensional space body, by updating the display parameters of the object within the three-dimensional space body, based on the operation information on the object within the three-dimensional space body;
display the object within the three-dimensional space body, based on the display parameters of the object within the three-dimensional space body; and
display the object within the three-dimensional space body, based on the updated display parameters of the object within the three-dimensional space body.

18. The device according to claim 10, wherein the user is a group that includes at least two target users, and the control module is further configured to:
determine the display parameters of the object within the three-dimensional space body in the three-dimensional space for each target user, based on the activity information of the target user.

19. A non-transitory computer-readable medium storing computer instructions that, when executed by one or more processors, cause the one or more processors to implement a display method comprising:
receiving activity information of a user, the activity information including a current location of the user;
determining display parameters of an object within a three-dimensional space body in a three-dimensional space, based on the activity information, wherein the three-dimensional space includes one or more three-dimensional space bodies, and determining the display parameters includes determining a positional offset between the current location of the user and a first position, the first position corresponding to specific display parameters of the object within the three-dimensional space body, the specific display parameters providing the user with optimal viewing experience when the user is at the first position; and
displaying the object within the three-dimensional space body, based on the display parameters of the object within the three-dimensional space body.

* * * * *